United States Patent
Zeeb et al.

(10) Patent No.: US 11,498,655 B2
(45) Date of Patent: Nov. 15, 2022

(54) PRESSURE BULKHEAD FOR AN AIRCRAFT

(71) Applicant: Premium Aerotec GmbH, Augsburg (DE)

(72) Inventors: Sergej Zeeb, Augsburg (DE); Sergiu Irimie, Augsburg (DE)

(73) Assignee: Premium Aerotec GmbH, Augsburg (DE)

( * ) Notice: Subject to any disclaimer, the term of this patent is extended or adjusted under 35 U.S.C. 154(b) by 308 days.

(21) Appl. No.: 16/201,540

(22) Filed: Nov. 27, 2018

(65) Prior Publication Data

US 2019/0210706 A1 Jul. 11, 2019

(30) Foreign Application Priority Data

Nov. 29, 2017 (DE) .................. 10 2017 221 444.9

(51) Int. Cl.
*B64C 1/10* (2006.01)
*B64C 1/14* (2006.01)

(52) U.S. Cl.
CPC ............. *B64C 1/10* (2013.01); *B64C 1/1446* (2013.01)

(58) Field of Classification Search
CPC ........... B64C 1/10; B64C 1/14; B64C 1/1446; B64C 1/1407
See application file for complete search history.

(56) References Cited

U.S. PATENT DOCUMENTS

| 4,588,147 A * | 5/1986 | Lindsey, Jr. | ............... B64C 7/00 343/705 |
| 5,934,616 A * | 8/1999 | Reimers | .................... B64C 1/10 244/119 |
| 6,029,933 A * | 2/2000 | Holman | .................... B64C 1/10 244/129.4 |
| 6,378,805 B1 * | 4/2002 | Stephan | .................... B64C 1/10 244/119 |

(Continued)

FOREIGN PATENT DOCUMENTS

| DE | 10 2008 040 213 B4 | 8/2011 |
| DE | 10 2013 224 233 A1 | 5/2015 |

(Continued)

OTHER PUBLICATIONS

German Office Action for Application No. 10 2017 221 444.9 dated May 25, 2018.

*Primary Examiner* — Richard R. Green
*Assistant Examiner* — Ashesh Dangol
(74) *Attorney, Agent, or Firm* — Jenkins, Wilson, Taylor & Hunt, P.A.

(57) ABSTRACT

A pressure bulkhead for the pressure-tight axial closure of a pressurized fuselage of an aircraft or spacecraft that can be put under an internal pressure, comprises a pressure dome, which is designed with a concave inner surface and a convex outer surface; inspection hatches, which each form an aperture in the pressure dome from the inner surface to the outer surface; and pressure covers for pressure-tight closure of the inspection hatches, wherein the pressure covers each have a cover and a pressure seal, wherein the cover is designed for the repeatedly releasable fixing of the pressure cover on the concave inner surface over the inspection hatch and wherein the pressure seal is formed at the edge of the cover for the pressure-tight closure of the cover with the pressure dome.

14 Claims, 2 Drawing Sheets

(56) References Cited

U.S. PATENT DOCUMENTS

| | | | |
|---|---|---|---|
| 6,425,794 B1* | 7/2002 | Levy | A63H 27/02 |
| | | | 446/61 |
| 6,474,600 B1* | 11/2002 | Apps | B64C 1/061 |
| | | | 244/129.5 |
| 8,939,404 B2 | 1/2015 | Sayilgan et al. | |
| 9,180,957 B2 | 11/2015 | Weber et al. | |
| 9,637,215 B2 | 5/2017 | Joern et al. | |
| 9,776,704 B1 | 10/2017 | Rufino et al. | |
| 2003/0234322 A1* | 12/2003 | Bladt | B64C 1/1484 |
| | | | 244/129.3 |
| 2014/0332178 A1* | 11/2014 | Petrosky | F22B 37/005 |
| | | | 165/11.2 |
| 2016/0210375 A1* | 7/2016 | Chen et al. | B64C 1/1492 |
| 2016/0229513 A1* | 8/2016 | Scheel et al. | |

FOREIGN PATENT DOCUMENTS

| | | |
|---|---|---|
| EP | 2 098 448 A1 | 9/2009 |
| EP | 2 485 941 B1 | 8/2015 |

* cited by examiner

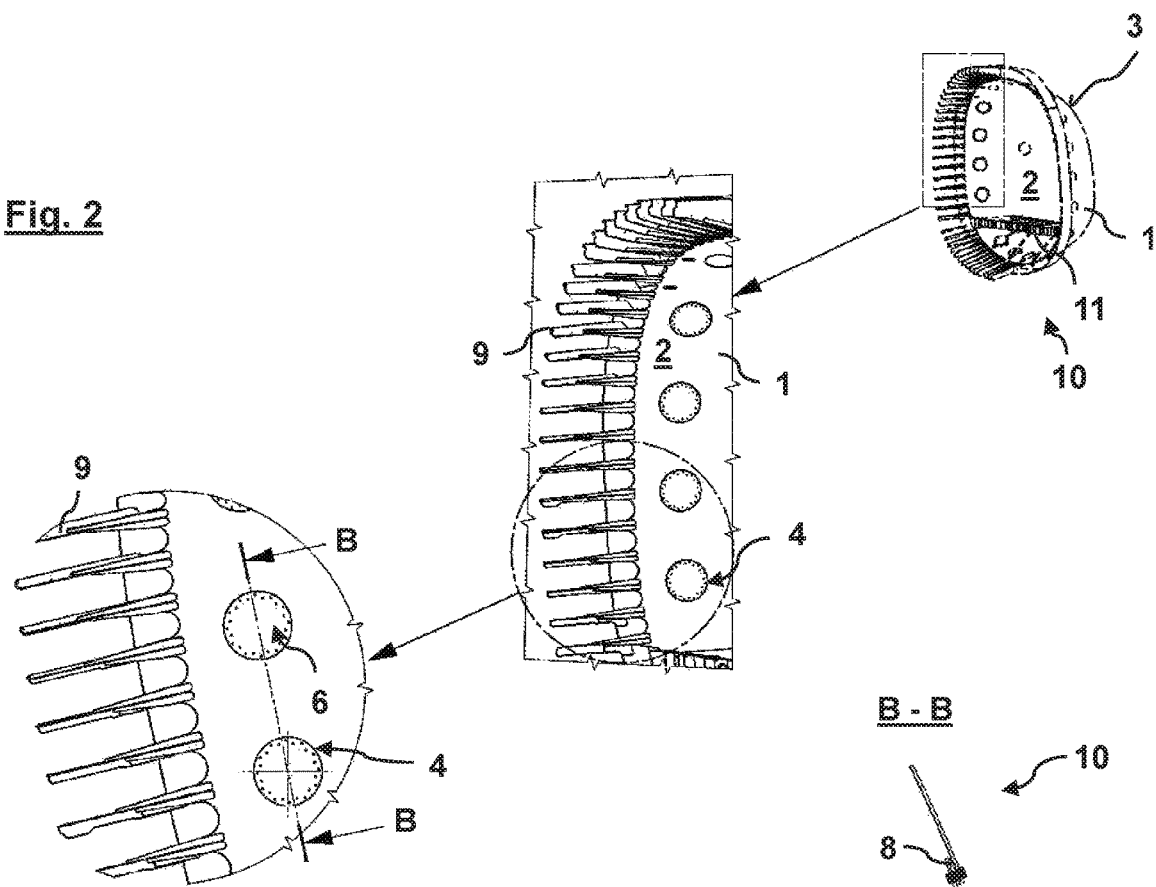
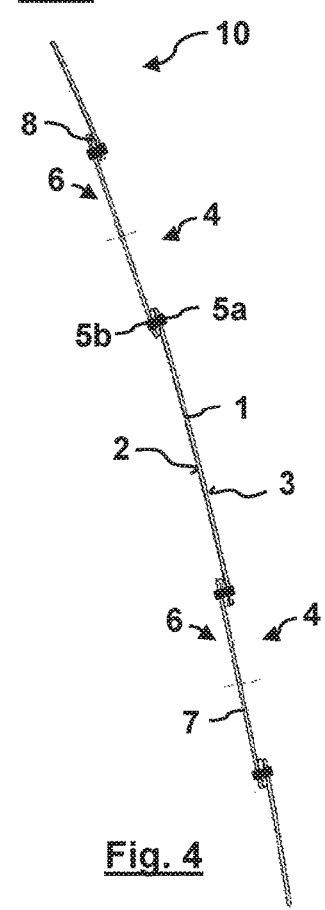
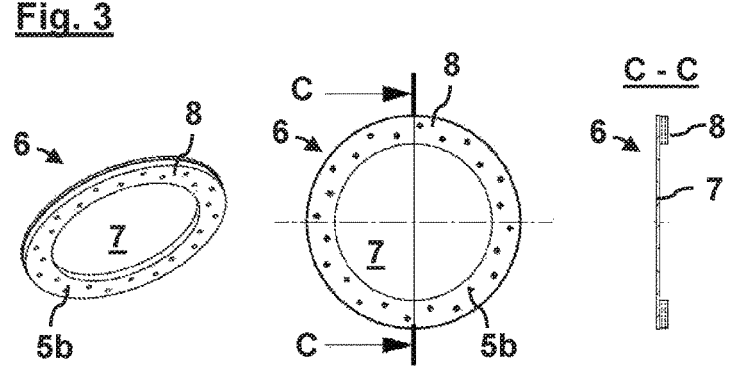

PRESSURE BULKHEAD FOR AN AIRCRAFT

CROSS-REFERENCE TO RELATED APPLICATION

This application claims priority to German Application No. 10 2017 221 444.9 filed Nov. 29, 2017, the entire disclosure of which is incorporated by reference herein.

TECHNICAL FIELD

The present disclosure relates to a pressure bulkhead for the pressure-tight axial closure of a pressurized fuselage of an aircraft or spacecraft that can be put under an internal pressure.

BACKGROUND

In order to keep an internal pressure of a passenger cabin at a suitable level, e.g. atmospheric pressure, even at high altitudes, passenger aircraft have a pressure bulkhead at a rear axial end, the bulkhead establishing pressure tightness of the passenger cabin relative to the primary structure of the aircraft fuselage. In modern aircraft construction, efforts are made to save weight as far as possible and, at the same time, to achieve adequate stiffness and robustness in respect of the many and various loads which occur. For this purpose, pressure bulkheads can be manufactured from metallic materials and/or fibre-reinforced composite materials, such as carbon fibre reinforced plastic (CFRP). In this case, the actual pressure bulkhead often has a basic shape resembling a spherical dome projecting in the direction of the rear of the aircraft, and is therefore also referred to as a pressure dome, which can, in turn, be provided with elongate and/or net-like reinforcing elements in areas that are particularly subject to loads, cf. EP 2 098 448 A1, EP 2 485 941 B1 and DE 10 2013 224 233 A1, for example. In general, a pressure bulkhead of this kind can comprise further structural elements, which are required for the pressure-tight closure of the relevant aircraft fuselage region and for transmitting the forces resulting from the internal pressure into the fuselage shell structure of the aircraft. For example, the pressure dome of the pressure bulkhead can be attached to one or more circumferential frames and/or an external skin of the fuselage by way of intermediate pieces and further components.

Sometimes, such pressure bulkheads have isolated through openings for supply lines, such as pipes, hydraulic and/or pneumatic lines or the like (cf. DE 10 2013 224 233 A1, for example). In order furthermore to ensure the pressure tightness of the pressure bulkhead, these openings are permanently closed in a pressure-tight way after assembly, e.g. with an attachment applied in a fixed manner. In typical designs, pressure domes have such a small curvature and hence projection in the direction of the rear that those regions of the fuselage which are situated at the rear behind the projection of the pressure dome can be inspected at any time without the permanently installed structure of the pressure bulkhead representing an obstacle. However, the small curvature has the effect that the outer edges of the pressure dome are aligned at a relatively steep angle to the surrounding fuselage, making actual attachment to the frames and/or the external skin complicated.

Given this background, it is the underlying object of the present disclosure to find improved solutions for the pressure-tight axial closure of a passenger cabin.

SUMMARY

According to the disclosure herein, this object is achieved by a pressure bulkhead and by an aircraft or spacecraft having features disclosed herein.

Accordingly, a pressure bulkhead for the pressure-tight axial closure of a pressurized fuselage of an aircraft or spacecraft that can be put under an internal pressure is provided. The pressure bulkhead comprises a pressure dome, which is designed or configured with a concave inner surface and a convex outer surface; inspection hatches, which each form an aperture in the pressure dome from the inner surface to the outer surface; and pressure covers for pressure-tight closure of the inspection hatches, wherein the pressure covers each have a cover and a pressure seal, wherein the cover is designed or configured for the repeatedly releasable fixing of the pressure cover on the concave inner surface over the inspection hatch and wherein the pressure seal is formed at the edge of the cover for the pressure-tight closure of the cover with the pressure dome.

An aircraft or spacecraft having a pressure bulkhead according to the disclosure herein is furthermore provided.

A concept underlying the present disclosure comprises a pressure dome with a multiplicity of inspection hatches that can be closed in a pressure-tight manner and thereby to enable access at any time to the structure lying behind the dome, i.e. to ensure inspection or assembly independently of the curvature and specific shape of the dome. For this purpose, the closures of the inspection hatches are designed to be repeatedly released, i.e. they can be opened and closed again as often as desired. It is thereby possible, in particular, to form a pressure dome with a very much larger axial depth than is conventionally possible since the outer surface thereof can be brought virtually as close as desired to the surrounding fuselage. Inspection and/or assembly work can simply be carried out through the opened inspection hatches. The use of a deeper dome shape, i.e. a more deeply recessed spherical geometry in the direction of the rear, furthermore simplifies the coupling of the pressure dome to the pressurized fuselage of the aircraft. A pressure dome with an increased projection can be aligned at a relatively small angle to the fuselage at the edge, i.e. at its outer edges in the vicinity of the surrounding fuselage. Attachment to frames, stringers and/or a skin area via simple fuselage attachment struts is thereby possible, ensuring an improved force flow profile inter alia. Ultimately, it is thus possible to save on components and installation work, i.e. weight and costs, by virtue of the solution according to the disclosure herein. It is furthermore possible to make use of the internal space situated axially within the concave inner surface of the pressure dome. For example, a cabin floor of an adjoining passenger cabin can be extended into the pressure dome in the direction of the rear. This additional cabin area can be used to accommodate additional seats or rows of seats, for example.

A pressure dome in the sense according to the disclosure herein is taken to mean a dome-shaped pressure wall within a fuselage of an aircraft or spacecraft which generally has a concave inner surface and a convex outer surface that are curved in such a way that a projection in the axial direction is formed within the fuselage, e.g. in the direction of the rear. The pressure bulkhead and/or the pressure dome can be formed, for example, from a fibre composite material, e.g. CFRP. The pressure bulkhead and/or the pressure dome can have a monolithic structure. In addition, further components can be mounted on the pressure dome, such as stiffening elements and/or reinforcements. In principle, it is also possible to integrate such structures of composite construction in a monolithic way into the actual pressure dome.

A pressurized fuselage in the sense according to the disclosure herein is a fuselage region of an aircraft or spacecraft that can be closed off in a pressure-tight way and can be kept at atmospheric pressure, for example. A pressurized fuselage in the sense according to the disclosure herein can comprise a passenger cabin with one or more passenger decks and/or a cargo hold or cargo deck, for example.

According to a development, the inspection hatches can be formed at the edge in the pressure dome. In particular, a multiplicity of inspection hatches can surround the longitudinal axis of the aircraft at a predetermined radial spacing and the same relative spacing with respect to one another. In this illustrative development, the inspection hatches can form a ring around the longitudinal axis in the region of the outer edge of the pressure dome. This ensures that the edge regions, in particular, of the pressure bulkhead are accessible via the inspection hatches in the region of the surrounding pressurized fuselage.

According to a development, the inspection hatches can be of round design. In corresponding fashion, the pressure covers and/or covers can be of round design.

According to a development, a multiplicity of connecting structures can be formed on the pressure dome around each inspection hatch. In corresponding fashion, the pressure covers can each be provided with a multiplicity of mating connecting structures. For example, the connecting structures can form a screwed joint together with the mating connecting structures. For example, at least the connecting structure and/or the mating connecting structure can be designed as a thread or screw. As an alternative or in addition, other connecting systems known to a person skilled in the art are provided in principle.

According to a development, the connecting structures and the mating connecting structures can be designed to form a frictional connection between the pressure dome and the pressure covers.

According to a development, the connecting structures and the mating connecting structures can be designed to form at least one of the following: a clamped, rotary, screwed or pressure closure or the like. For example, known quick closure techniques involving clamped, rotary, and/or pressure closures can be used, with the aid of which a large number of pressure covers can be fitted in a manner which is efficient in terms of time.

According to a development, the pressure seal can comprise an elastomer. For example, the pressure seal can be designed as an elastomer seal, i.e. as an elastomer ring.

According to a development, the elastomer can be a foam. In a specific example, the pressure seal can be composed of an elastomeric foam, e.g. a flexible foam. Such a material has the advantage that irregularities in the dome surface can be compensated at specific points by the foam, thus enabling the pressure cover to be fitted accurately into the associated inspection hatch. Under typical realistic conditions of use, a pressure dome in any case has slight differences in curvature at each point of its surface owing to the different effective loads. A flexible pressure seal can compensate these differences in an optimum way.

According to a development, the pressure seal can be of annular design. In this and other developments, the pressure seal can have holes or, more generally, through openings for coupling the connecting structures to the mating connecting structures through the pressure seal.

According to a development, the pressure dome can have an axial depth and a transverse extent. The ratio of the axial depth to the transverse extent can be at least 0.3. In particular, the ratio of the axial depth to the transverse extent can be at least 0.35. In contrast, typical pressure domes have a ratio of the axial depth to the transverse extent of no more than about 0.25. In most cases, this ratio is even significantly smaller than this illustrative value.

The above embodiments and developments can be combined in any desired manner, as and when appropriate. Further possible embodiments, developments and implementations of the disclosure herein also include combinations, not explicitly mentioned, of features of the disclosure herein that are described above or below with reference to the embodiment examples. In this context, a person skilled in the art will, in particular, also add individual aspects as improvements or supplementary features to the respective basic form of the present disclosure.

BRIEF DESCRIPTION OF THE DRAWINGS

The disclosure herein is explained in greater detail below by the embodiment examples indicated in the schematic figures. Here:

FIG. 2 shows schematic perspective views of segments of different sizes of the pressure bulkhead from FIG. 1;

FIG. 3 shows schematic perspective, side and sectional views of a pressure cover of the pressure bulkhead from FIGS. 1 and 2; and FIG. 4 shows a schematic sectional view of pressure covers corresponding to FIG. 3 in an assembled state.

Figure 1:
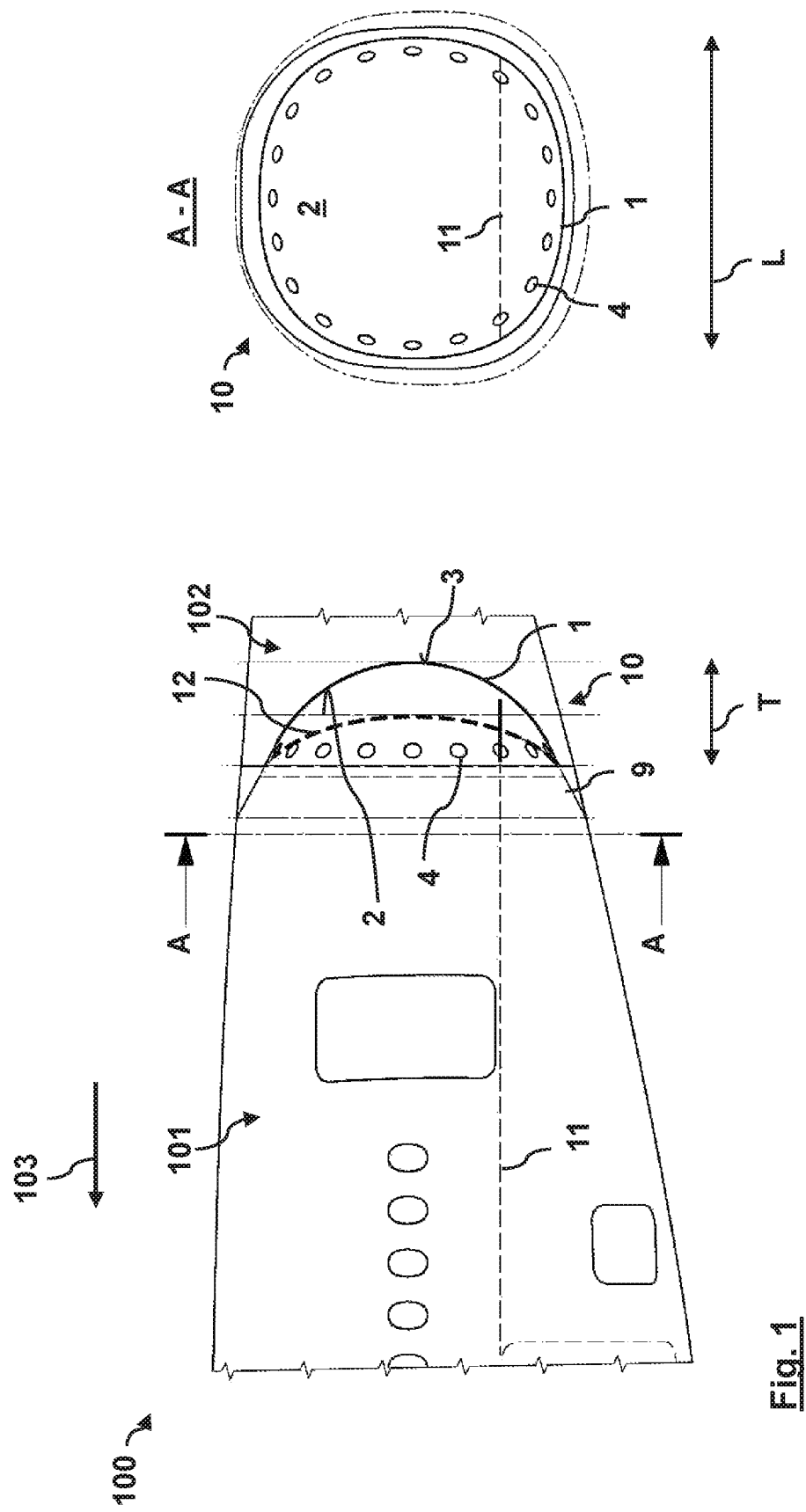
FIG. 1 shows a schematic side view and a sectional view of a pressure bulkhead according to one embodiment of the disclosure herein.

The attached figures are intended to impart greater understanding of the embodiments of the disclosure herein. They illustrate embodiments and, in combination with the description, serve to explain principles and concepts of the disclosure herein. Other embodiments and many of the stated advantages will become apparent when viewing the drawings. The elements of the drawings are not necessarily shown to scale relative to one another.

In the figures of the drawing, identical, functionally identical and identically acting elements, features and components are each provided with the same reference signs, unless stated otherwise.

DETAILED DESCRIPTION

FIG. 1 shows a schematic side view (on the right) and a sectional view (on the left) of a pressure bulkhead 10 according to one embodiment of the disclosure herein.

The pressure bulkhead 10 forms a pressure-tight closure of a pressurized fuselage 101 of an aircraft 100 relative to a rear region 102 of the aircraft 100 in an axial direction (cf. the direction of flight 103 of the aircraft 100 indicated in FIG. 1). The aircraft 100 illustrated can be, for example, a passenger aircraft, e.g. a narrow-bodied aircraft, which has a pressurized fuselage 101 with a passenger deck situated therein, the fuselage being held at atmospheric pressure. By way of example, a cabin floor 11 of the passenger deck is depicted in FIG. 1. The passenger deck can extend over the entire longitudinal extent of the pressurized fuselage 101 from a cockpit (not depicted) to the pressure bulkhead 10, for example. The illustrated embodiment of the aircraft 100 should be understood merely as an example of a general passenger aircraft. It is likewise possible, for example, further passenger decks, cargo decks etc. to be provided, e.g. two passenger decks one above the other.

The pressure bulkhead 10 comprises a pressure dome 1 with a concave inner surface 2, a convex outer surface 3 and a multiplicity of inspection hatches 4, which each form an aperture in the pressure dome 1 from the inner surface 2 to the outer surface 3. The pressure dome 1 forms a pressure wall with a projection counter to the direction of flight 103, that is to say in the direction of the rear region 102.

The pressure dome 1 is attached to the structure of the aircraft 100 by a multiplicity of fuselage attachment struts 9. For example, the fuselage attachment struts 9 can be connected directly to a frame, a stringer and/or a skin area of the aircraft 100. An aircraft 100 of this kind or a pressurized fuselage 101 of this kind is subjected to considerable loads and stresses in flight. In this case, various forces and moments have to be taken into account, e.g. transverse forces, torsional and bending moments etc. Moreover, forces are also exerted by the considerable internal pressure. The pressure bulkhead 10 is designed to absorb and/or dissipate these incoming and/or outgoing loads.

The inspection hatches 4 are formed at equal spacings on a ring at the edge in the pressure dome 1 and surround the longitudinal axis of the aircraft 100 in the manner of satellites. In order to close the inspection hatches 4 in a pressure-tight manner, pressure covers 6 are provided, and these are explained in greater detail below with reference to FIGS. 2-4.

The inspection hatches 4 are used for inspection, assembly and/or maintenance work on the pressure bulkhead 10 and, in particular, on the surrounding rear region 102. For this reason, the inspection hatches 4 are arranged in the region of the fuselage attachments struts 9 of the pressure bulkhead 10, in an outer region of the pressure dome 1 relative to the longitudinal axis of the aircraft 100.

The inspection hatches 4 make it possible to provide the pressure dome 1 with a highly curved geometry in the form of a projection recessed in the direction of the rear, which can be made considerably larger than in conventional pressure domes. The size of the projection of a pressure dome can be characterized by the ratio of its axial depth T to its transverse extent L, for example. In the present case, this ratio of the axial depth T to the transverse extent L can be significantly greater than usual, possibly having a value of 0.35 or higher, for example. Conventional pressure domes have maximum ratios of 0.25. Often, the values are even significantly lower.

In order to illustrate this different geometry of the pressure dome 1 under consideration and the advantages thereof, the illustrative profile of a conventional bulkhead projection 12 is indicated by a dashed line in FIG. 1. FIG. 1 makes clear that the pressure dome 1 in this embodiment example is curved significantly more in the direction of the rear region 102 than the illustrative conventional bulkhead projection 12.

On the one hand, this steep curvature now offers the advantage that the fuselage attachment struts 9 can be passed from the pressure dome 1 to the surrounding fuselage along a flatter path. In contrast, the conventional bulkhead projection 12 requires a very steep entry to the fuselage region, typically necessitating complex and multi-part coupling with heavy components. The load or force profile of the present solution is thus significantly more advantageous than that of conventional solutions. Furthermore, there is a saving in terms of installation costs and weight and thus production costs. The pronounced projection of the present solution offers the further advantage that significantly more space is created within the pressurized fuselage 101 in the passenger cabin adjoining the inner surface 2, and this can now be used for various purposes. In one specific example, the cabin floor can be extended into the pressure dome 1 in order, for example, to accommodate additional rows of seats, seats and/or cabin monuments, such as toilets, luggage bins or galleys, recuperation and/or work areas for the flight crew etc.

On the other hand, the inspection hatches 4 ensure that the rear region 102 around the edge of the pressure dome 1 or pressure bulkhead 10 is accessible at all times by opening the pressure-tightly closed inspection hatches 4.

FIG. 2 shows schematic perspective views of segments of different sizes of the pressure bulkhead 10 from FIG. 1, wherein, in particular, the pressure covers 6 that effect pressure-tight closure of the inspection hatches 4 are shown. FIG. 3 shows detailed schematic perspective, side and sectional views of an illustrative pressure cover 6 of the pressure bulkhead 10 from FIGS. 1 and 2.

The pressure cover 6 comprises a round cover 7 and an annular pressure seal 8, which is secured on the edge of the cover 7 for the pressure-tight closure thereof. For the repeatedly releasable fixing of the pressure cover 6 on one of the inspection hatches 4 by connecting structures 5a, which are formed in the concave inner surface 2 around the inspection hatch 4, the cover 7 and the pressure seal 8 are provided with a multiplicity of mating connecting structures 5b. For example, the connecting structures 5a can form a screwed joint or the like with the mating connecting structures 5b.

In this regard, FIG. 4 shows a schematic sectional view of the pressure cover 6 from FIG. 3 in an assembled state.

The pressure seal 8 can comprise, for example, an elastomer ring and/or an elastomeric foam or the like, which is fixed between the pressure cover 6 and the pressure dome 1 by virtue of the coupling of the connecting structures 5a to the mating connecting structures 5b. The choice of an elastomeric material offers the advantage that the pressure seal to a certain extent adapts automatically to possible irregularities and/or projections of the inner surface 2 of the pressure dome 1. Under realistic conditions of use, a pressure wall in the form of a spherical segment does not have a symmetrical shape. On the contrary, the local curvature of the dome surface differs from point to point. In the embodiment under consideration, the covers 7 can advantageously be designed as simple flat discs, which can nevertheless be inserted with an accurate fit into the inspection hatches 4 by virtue of the flexibility of the pressure seal 8, thus enabling pressure tightness to be ensured at all times.

In summary, the present solution offers a large number of advantages over conventional pressure bulkheads. By virtue of the geometry, a better force profile and, ultimately, optimized load distribution are made possible. Customarily used attachment components, such as Y-profile struts or the like, are no longer required to attach the pressure bulkhead to the surrounding fuselage and to introduce the loads into the latter. The present solution thus requires fewer components and has a lower weight, and, ultimately, its assembly is less expensive and more efficient in terms of time. By virtue of the deeper pressure dome, the useful space in an adjoining passenger cabin is enlarged. Accessibility to the rear region behind the pressure bulkhead is ensured by the inspection hatches.

In the preceding detailed description, various features have been combined in one or more examples in order to improve the cogency of the illustration. However, it should be clear that the above description is merely illustrative but in no way restrictive in nature. It serves to cover all the alternatives, modifications and equivalents of the various features and embodiment examples. Many other examples will be immediately and directly clear to a person skilled in the art based on their expert knowledge in view of the above description.

In one example, inspection hatches can be provided in an arrangement of a different kind. As an alternative or in addition, it is possible, for example, for further inspection hatches to be provided in the inner regions of the pressure dome, e.g. in the region of the longitudinal axis of the aircraft. Moreover, the inspection hatches can have other geometries. It will be clear to a person skilled in the art that many different connecting systems for coupling the pressure covers to the pressure dome are possible. In one specific example, the pressure covers can be articulated on the pressure dome, for example, thus enabling the inspection hatches to be opened without having to take off or remove the pressure covers.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). The embodiment examples have been chosen and described to enable the principles underlying the disclosure herein and their possible uses in practice to be illustrated as well as possible. This will enable those skilled in the art to modify and use the disclosure herein and its various embodiment examples in an optimum way in respect of the intended purpose. In the claims and the description, the terms "containing" and "having" are used as linguistically neutral concepts for the corresponding term "comprising". Furthermore, use of the terms "a" and "an" is not intended, in principle, to exclude a plurality of features and components described in this way. In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 1 pressure dome
2 inner surface
3 outer surface
4 inspection hatch
5a connecting structure
5b mating connecting structure
6 pressure cover
7 cover
8 pressure seal
9 fuselage attachment strut
10 pressure bulkhead
11 cabin floor
12 conventional bulkhead projection
100 aircraft
101 pressurized fuselage
102 rear region
103 direction of flight
T axial depth
L transverse extent

The invention claimed is:

1. A pressure bulkhead for pressure-tight axial closure of a pressurized fuselage of an aircraft or spacecraft that can be put under an internal pressure, the pressure bulkhead comprising:
a pressure dome comprising a concave inner surface and a convex outer surface;
three or more inspection hatches which each form an aperture in the pressure dome from the inner surface to the outer surface; and
three or more pressure covers, each of which is for pressure-tight closure of a corresponding one of the three or more inspection hatches, wherein the pressure covers each comprise a cover and a pressure seal, wherein the cover is configured for repeatedly releasable fixing of the pressure cover on the concave inner surface over a corresponding one of the inspection hatches, wherein the pressure seal is formed at an edge of the cover for the pressure-tight closure of the cover with the pressure dome, wherein a dimension of each cover is larger in diameter than a diameter of a corresponding one of the inspection hatches, wherein each pressure seal is configured for complete pressure-tight closure of a corresponding one of the inspection hatches around a circumferential direction of the pressure covers, wherein the pressure covers are configured to rest together with the pressure seals on the concave inner surface of the pressure dome and the pressure seals are in contact with both the respective pressure covers and the concave inner surface of the pressure dome, such that each cover at least partially overlaps with the concave inner surface of the pressure dome, wherein the pressure seals are located directly between each cover and the concave inner surface of the pressure dome with regard to an axial direction of the fuselage, wherein the pressure covers rest on a high-pressure side of the pressure dome, and wherein each pressure seal is limited in a radial dimension to that of the cover of a corresponding one of the pressure covers;
wherein the inspection hatches, together with the pressure covers corresponding therewith, are formed at equal spacings on a ring at an edge of the pressure dome and surround a longitudinal axis of the aircraft; and
wherein the inspection hatches, together with the pressure covers corresponding therewith, are located at positions incident with a cargo compartment of the aircraft as well as with a passenger compartment of the aircraft.

2. The pressure bulkhead according to claim 1, wherein the inspection hatches are of round design.

3. The pressure bulkhead according to claim 1, comprising a multiplicity of connecting structures formed on the pressure dome around each inspection hatch, and wherein the pressure covers each comprise a multiplicity of mating connecting structures.

4. The pressure bulkhead according to claim 3, wherein the connecting structures and the mating connecting structures are configured to form at least one of: a clamped, rotary, screwed and pressure closure.

5. The pressure bulkhead according to claim 1, wherein the pressure seal comprises an elastomer.

6. The pressure bulkhead according to claim 5, wherein the elastomer is a foam.

7. The pressure bulkhead according to claim 1, wherein the pressure seal is of annular design.

8. The pressure bulkhead according to claim 1, wherein the pressure dome has an axial depth and a transverse extent, wherein a ratio of the axial depth to the transverse extent is at least 0.3.

9. The pressure bulkhead according to claim 8, wherein the pressure dome has an axial depth and a transverse extent, wherein a ratio of the axial depth to the transverse extent at least 0.35.

10. The pressure bulkhead according to claim 1, wherein the pressure seals are each in direct contact with one of the pressure covers and the pressure dome.

11. The pressure bulkhead according to claim 1, wherein the pressure seals are positioned between one of the pressure covers and the pressure dome according to a layered arrangement.

12. An aircraft or spacecraft comprising a pressure bulkhead for pressure-tight axial closure of a pressurized fuselage of the aircraft or spacecraft that can be put under an internal pressure, the pressure bulkhead comprising:

a pressure dome comprising a concave inner surface and a convex outer surface;

three or more inspection hatches which each form an aperture in the pressure dome from the inner surface to the outer surface; and three or more pressure covers for pressure-tight closure of a corresponding one of the three or more inspection hatches, wherein the pressure covers each comprise a cover and a pressure seal, wherein the cover is configured for repeatedly releasable fixing of the pressure cover on the concave inner surface over a corresponding one of the inspection hatches, wherein the pressure seal is formed at an edge of the cover for the pressure-tight closure of the cover with the pressure dome, wherein a dimension of each cover is larger in diameter than a diameter of a corresponding one of the inspection hatches, wherein each pressure seal is configured for complete pressure-tight closure of a corresponding one of the inspection hatches around a circumferential direction of the pressure covers, wherein the pressure covers are configured to rest together with the pressure seals on the concave inner surface of the pressure dome and the pressure seals are in contact with both the respective pressure covers and the concave inner surface of the pressure dome, such that each cover at least partially overlaps with the concave inner surface of the pressure dome, wherein the pressure seals are located directly between each cover and the concave inner surface of the pressure dome with regard to an axial direction of the fuselage, wherein the pressure covers rest on a high-pressure side of the pressure dome, and wherein each pressure seal is limited in a radial dimension to that of the cover of a corresponding one of the pressure covers;

wherein the inspection hatches, together with the pressure covers corresponding therewith, are formed at equal spacings on a ring at an edge of the pressure dome and surround a longitudinal axis of the aircraft; and wherein the inspection hatches, together with the pressure covers corresponding therewith, are located at positions incident with a cargo compartment of the aircraft as well as with a passenger compartment of the aircraft.

13. The aircraft or spacecraft according to claim 12, wherein the pressure seals are each in direct contact with one of the pressure covers and the pressure dome.

14. The aircraft or spacecraft according to claim 12, wherein the pressure seals are positioned between one of the pressure covers and the pressure dome according to a layered arrangement.

* * * * *